(12) United States Patent
Aznar et al.

(10) Patent No.: US 7,065,080 B1
(45) Date of Patent: Jun. 20, 2006

(54) SYSTEM AND METHOD FOR ENABLING REMOTE SURVEILLANCE OF ATM NETWORK SWITCHING NODE PORTS

(75) Inventors: Ange Aznar, La Colle s/Loup (FR); Daniel Orsatti, La Gaude (FR); Jean-Claude Zunino, Nice (FR); Bruno Rousseau, Vence (FR)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 09/676,997

(22) Filed: Sep. 29, 2000

(30) Foreign Application Priority Data

Oct. 21, 1999 (EP) .................................. 99480110

(51) Int. Cl.
*H04L 12/56* (2006.01)
(52) U.S. Cl. ................ 370/390; 370/395.1; 370/395.3; 370/409
(58) Field of Classification Search ............ 370/395.1, 370/395.2, 395.21, 395.3, 390, 400, 409, 370/432
See application file for complete search history.

(56) References Cited

U.S. PATENT DOCUMENTS

| 5,305,311 | A | * | 4/1994 | Lyles .......................... 370/390 |
| 5,677,905 | A | * | 10/1997 | Bigham et al. ........... 370/395.1 |
| 5,991,297 | A | * | 11/1999 | Palnati et al. ................ 370/389 |
| 6,404,740 | B1 | * | 6/2002 | Yoshida .................... 370/241.1 |
| 6,606,302 | B1 | * | 8/2003 | Delattre et al. ........... 370/230.1 |
| 6,633,543 | B1 | * | 10/2003 | Storr ........................ 370/236.1 |
| 6,636,510 | B1 | * | 10/2003 | Lee et al. .................... 370/390 |
| 2003/0021279 | A1 | * | 1/2003 | Shobatake ............... 370/395.2 |

* cited by examiner

*Primary Examiner*—Chi Pham
*Assistant Examiner*—Rhonda Murphy
(74) *Attorney, Agent, or Firm*—Daniel E. McConnell; Dillon & Yudell LLP

(57) ABSTRACT

In an ATM cell-relay network usually comprising several switching nodes a method enabling remote surveillance of any entry port to any switching node of the network. The method first assumes that a path is set up from the entry port to a remote observation point. Then, all cells of the incoming traffic, entering entry port to be watched, are duplicated and marked. After which they are transported, unaltered, following the path, up to the observation point. The invention permits that any entry port of an ATM network, that may well span over large geographic areas, be conveniently observable and analyzed transparently i.e., without disturbing users traffic, from a remote location so as network can be maintained and run trouble free.

11 Claims, 6 Drawing Sheets

SYSTEM AND METHOD FOR ENABLING REMOTE SURVEILLANCE OF ATM NETWORK SWITCHING NODE PORTS

BACKGROUND OF THE INVENTION

1. Technical Field

The present invention relates generally to ATM (Asynchronous Transfer Mode) multi-node networks and more specifically to a system and method for enabling the surveillance, through the nodes and switching pieces of equipment forming the network, of any switching node port from any convenient remote access point.

2. Description of the Related Art

Broadband ISDN (Integrated Services Digital Network) was an attempt to set up a single unified, worldwide high-speed network in place of the multiplicity of existing networks for different applications. On one hand, the new, universal network was intended to replace the functions of current speech, data and television networks and, on the other hand, to provide enough scope for the implementation of future communications technologies.

The first work on standards for the universal network of the future was begun by CCITT (International Telegraph and Telephone Consultative Committee) in the late 1980s, under the title "B-ISDN". B-ISDN is based on ATM which is a data transmission technique belonging to the family of cell switched systems (cell relay). Unlike packet-switched systems, in which data packets of variable length can be multiplexed over a line interface, the length of a cell relay data packet is fixed and simply referred to as a cell. ATM is a specific implementation of cell relay and an integral element of the CCITT specification for B-ISDN.

ATM, as the name suggests, utilizes an asynchronous time division multiplexing scheme so that the data streams to be transmitted are converted into fixed-size cells and transferred asynchronously over a same physical medium between network nodes. The allocation of the units of information to the different transmission channels is carried out using numerical channel identifiers attached to each cell under the form of a VPi (Virtual Path identifier) and a VCi (Virtual Channel identifier).

ATM is a cell switching technology in which cell-switch units within network nodes route cells towards their final destination and which may also buffer the cells before transmission to a next node. Cell switching implies that a temporary end-to-end transmission path must be provided before any data can be transferred between sender and receiver. Thus, cell-switched networks can take advantage of the greatly varying bandwidth requirements in data communications by allocating unused transmission capacity to other virtual connections on an as needed basis.

Since cell-switched networks create only virtual transmission links (over a common physical transmission line), it is possible for cells to be lost if the memory capacity of the switching nodes is exceeded. This transfer procedure, which first requires a (virtual) link to be set up between the users, is said to be connection-oriented (as opposed to connection-less like e.g., IP the Internet Protocol). Links are categorized as either PVC (Permanent Virtual Connection), in which the link is set up once for all, as SVC (Switched Virtual Connection) in which the link is set up dynamically, on demand.

It is only after such a connection has been established, be it permanent or dynamic, that sending station can forward its data, under the form of cells, to the receiving station which receives them in the same order. However, if problems occur during the transfer of the data such as a buffer overload, resulting in discarded cells or the receipt of faulty or misdirected cells, the problem is immediately reported to the other end, which can react appropriately (generally by repeating the transmission of the cells forming a message so that the problem can be handled by the error recovery routines of the higher level protocols).

Thus, ATM switching units are key elements in any B-ISDN network. The fact that all ATM cells are the same size is exploited to implement multiport switching fabrics (typically 16×16 or 32×32) based on various efficient architectures which, when combined with the latest sub-micron fabrication processes, permit very high performances and aggregate throughputs which must be expressed in terabits per sec ($10^{12}$/sec). The remaining task of the switching fabric and switches at each node of a network then becomes to provide transmission paths between the input ports and output ports requested at any given time in such a way that the fewest possible conflicts occur.

For example, an internal conflict to a switch fabric may occur if two or more cells are competing for the same output port at the same time. Despite every effort being made during the architecture and design phases of switches and cell-networks in general to provide the necessary mechanisms to handle the data flows without conflicts, traffic congestion is inevitable in a node when either overall traffic is increasing or when a traffic spike occurs at the node at a given instant. Also, flaws and shortcomings that may be present in some of the numerous hardware and software pieces that together implement a network, although not serious enough to prevent the network from operating reasonably well and, in any case, at the satisfaction of the end users, may also trigger occasionally some of the previously mentioned problems such as cell discarding.

Therefore, it is of utmost importance for those in charge of running and maintaining such an ATM network to be able to watch it and analyze it, if not constantly, at least any time it is necessary, from any convenient access point, without having to disturb user traffic whatsoever. Moreover, because ATM networks are typically used nowadays to implement high performance backbones of many medium or large networks (contradicting the initial expectation that ATM would become the universal means to transport data, voice and all multimedia information, up to desktop) quality performance must be ensured with the proper tools, such that the high level of quality assurance expected of an ATM network is indeed delivered.

SUMMARY OF THE INVENTION

A method and a system enabling remote surveillance of any entry port to any switching node of an ATM cell-relay network are disclosed. Such an ATM cell-relay network usually comprises several switching nodes each having a plurality of ports. The method first assumes that a path is set up, through the ATM network, between an entry port and a remote observation point. Then, all cells of the incoming traffic, entering the entry port to be watched, are duplicated and marked. Subsequently, the cells are transported, following the path, up to the observation point. The preferred method of marking all duplicated cells comprises reserving one bit of the cells channel identifier to unambiguously distinguish them from the regular cells. This bit is asserted in every duplicated cell, such that the cells remains unaltered and are processed expeditiously in the intermediate switching nodes en route to the observation point. The method and system of the invention permit any entry port of an ATM network that may well span over large geographic areas, be conveniently observable and analyzed transparently i.e., without disturbing users traffic, from a remote location, such that the network can be maintained and operated trouble free.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
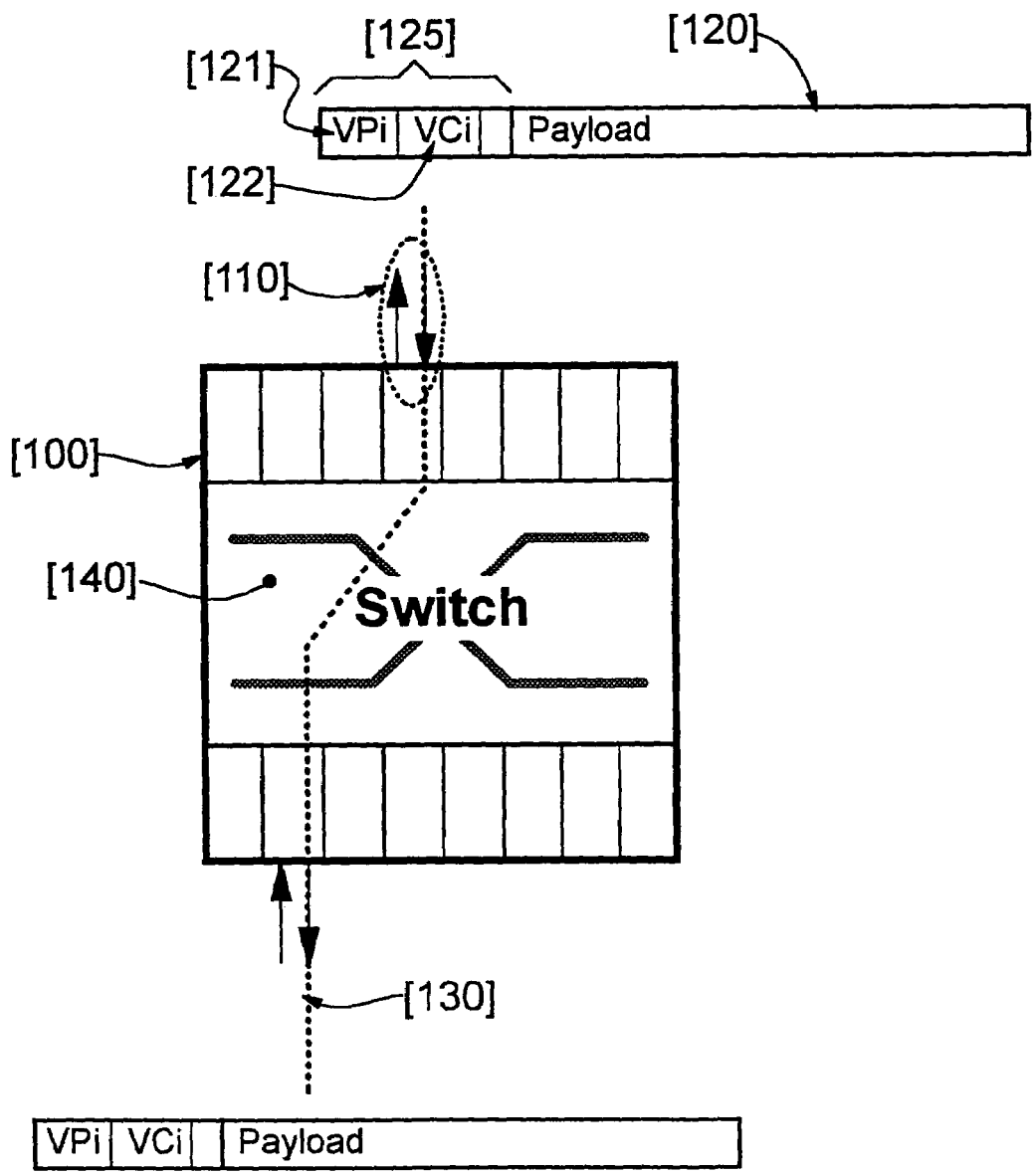
FIG. 1 depicts a switch within an ATM network.

With reference now to the figures and in particular with reference to FIG. 1, there is illustrated an ATM switch 100. In this figure, as an example, a 16×16 port switch 100 is shown. Each of the 16 ports, such as port 110, is a bi-directional port capable of receiving and sending ATM cells 120 carrying a connection identifier under the form of a VPi (Virtual Patch identifier) 121 and a VCi (Virtual Channel identifier) 122 part of the header 125 of every cell.

Switch 100 performs two basic jobs. First, it identifies the connection identifier of every incoming cell from the VPi and VCi fields mentioned hereinabove. Switch 100 then transports cells from input ports to output ports (e.g. 130) along a predetermined path towards their final destinations. The actual transport is carried out via a switching fabric 140 that provides dynamic transmission paths between the input ports and the output ports requested at any given time in such a way that the fewest possible conflicts occur like when two cells, from two different input ports, are competing for the same output port at the same time.

There are numerous architectures that have been proposed and implemented which all tend to reduce the transmission delay while increasing the aggregate throughput that can be handled through a switch. Nowadays, the latter parameter must be expressed in terabits/sec or $10^{12}$ bits/second. At the same time, switch designs tend to drastically limit the number of cells that must be discarded due to conflicts of the kind mentioned above. Cell loss rates as low as $10^{-10}$ are reported, meaning that less than one cell out $10^{10}$ cells going through a switch need to be discarded under nominal conditions. Therefore, ATM switches indeed provide the high level of performance required to address the exponentially growing demand for bandwidth from transport demands by a variety of traffic such as pure data, voice, still images and video on a unified network.

Figure 2:
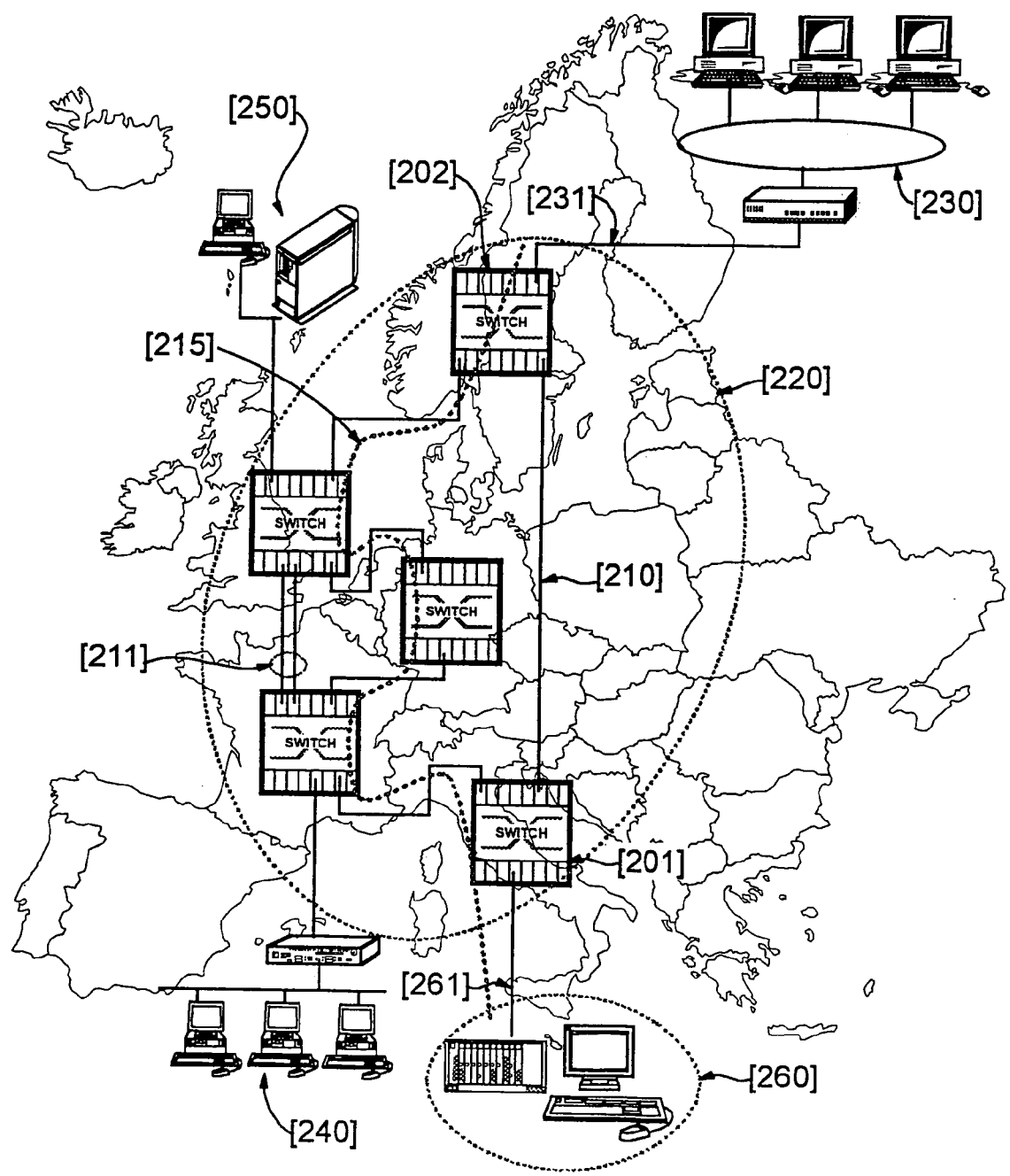
FIG. 2 illustrates an exemplary ATM network in which a preferred embodiment of the present invention may be practiced.

FIG. 2 shows a high performance ATM backbone network 220 comprising five switches including switches 201 and 202. Switches are interconnected through high speed links such as link 210, which in the depicted example, may be optical lines conforming to the well known SDH (Synchronous Digital Hierarchy) or SONET (Synchronous Optical Network) transmission standards respectively defined by the telecommunication standardization sector of the International Telecommunications Union or ITU-T in various G-series standards and by the American National Standards Institute or ANSI e.g., in T1.105. SDH and SONET have transmission rates that are compatible at 155.2 Mbps (referred to as STM-1 and STS-3 for SDH and SONET respectively), 622 Mbps (STM-4 and STS-12) and 2.48 Gbps (STM-16 and STS-48).

Very high performance backbone networks, such as backbone network 220, are capable of moving huge amounts of data over large distances that may well span over states and countries. Backbone network 220 also permit interconnection of thousands to millions of end-users including those on a Token Ring LAN 230, which in the depicted example is located in northern Europe. Token ring LAN 230 may require connection with southern European users on an Ethernet LAN 240, while both LANs may need to access resources from a third remote location 250.

It is of the utmost importance that backbone network 220 be operational 24-hour a day, 7-day a week. Various redundancy-based techniques are known in the art for achieving near 100% availability. Hence, it is often the case that inter-switch transmission lines are actually duplicated as shown in a duplicated link 211, such that a "hot" standby link is always ready to replace a failing link. This type of network must be closely managed and cannot be left unattended due to the enormity of traffic depending on its proper performance.

The present invention provides a method and system for monitoring the network from any access point to backbone network 220. From any such access point, it should be possible to monitor a remote switch port 231 (or any other entry port to any of the switching nodes forming the network 220 irrespective of their location at the periphery of, or within backbone network 220) from a distant location 260 where measuring equipment has been installed on a port 261 of switch 201 for the purpose of snooping all traffic entering port 231 or exiting port 231 from the group of users connected on Token Ring 230. This monitoring must be achievable through a direct link 210 between switches 201 and 202, or through any alternate path 215 encompassing other switches of the backbone if more appropriate.

The present invention permits such monitoring without any additional hardware, aside from tooling equipment in distant location 260. In addition the present invention eliminates the need for installation of dedicated lines between switches. This latter requirement is often automatically fulfilled in backbone network in which high speed links are duplicated for the above-mentioned reason, thus providing spare bandwidth that can be utilized occasionally for the surveillance of the network.

As is known in the art of ATM switches, an active port of a switch is equipped with a port adapter known as an adaptive blade or simply a "blade". Multiple such blades are are typically connected to corresponding multiple bi-directional switch fabric ports. Blades further include blade interface data communications lines in a variety of combinations including the number of lines, their speeds, the standards they are complying to and the types of physical interface e.g., optical or electrical.

A typical example of a blade interface line could be a blade interfacing sixteen optical STM-1/STS-3 communications lines at 155.2 Mbps. Such a blade interface is compatible with the European SDH and US SONET standards. Blades must be able to accommodate the incoming and outgoing traffic of the sixteen lines to a single switch-fabric port and thus must be capable of handling an average bi-directional traffic up to 2.4 Gbps.

The role of a blade is thus to concentrate and dispatch traffic from/to several lines from/to a higher speed switch fabric port so as to expand, as much as possible, the connectivity of switch fabric and take full advantage of its intrinsic performance capabilities. A switching node is therefore comprised of a switching fabric having ports to which blades are connected to allow adaptation to one or more transmission lines which become, in turn, ports of the switching node. The term "port", as employed in the following description, refers either to the switching fabric ports themselves or to the ports of the switching node (i.e., the end points of the transmission lines connected to the switch blades). The distinction in the intended meaning of "port" is not ambiguous from within the context.

A blade includes a receive side that handles all the incoming traffic received from the sixteen lines, and a transmit side that handles all the outgoing traffic to be dispatched over the typically multiple lines from the switch-fabric port.

The chief function of a blade receive side is to inspect each received cell, thus enforcing policing and performing the verification of the connections according to the Quality of Service (QoS) defined for each connection and possibly tagging or discarding nonconforming cells. The main task of the blade receive side is to determine the destination of an incoming cell (i.e., the port and blade it should be sent to) such that the cell follows the path assigned by the network manager (ATM is a connection oriented protocol which assumes that a path exists before traffic can start).

The assigned path is found from within a connections table that tracks all active virtual connections supported at any given time by the blade. Therefore, whenever a cell is received, the connections table is interrogated to determine through which outgoing port the received cell must exit. The connections table appends to the incoming cell the necessary information such that the cell can find its way out through the switch fabric. Depending on the switch fabric design and implementation, there are many ways in which this objective may be achieved. Irrespective of the particular method chosen, a switch fabric responds to incoming cells input through a given port to which a blade is connected by forwarding the incoming cells to the transmit side of the appropriate target blade.

At this point, it is worth noting that more than one switch fabric output port may need to be specified in the information appended to the cell because some cells must be forwarded to several ports for multicasting purposes. This function is generally supported within a switch fabric which is capable of replicating the incoming cells such that they are dispatched over several ports as necessary. Moreover, another level of multicasting may have to be performed in the transmit side of the blade. For example, in multi-line blade, a cell exiting a switch fabric port may have to be replicated several times so that the cell may be dispatched over all lines that the blade interfaces or a multiple thereof.

Figure 3:
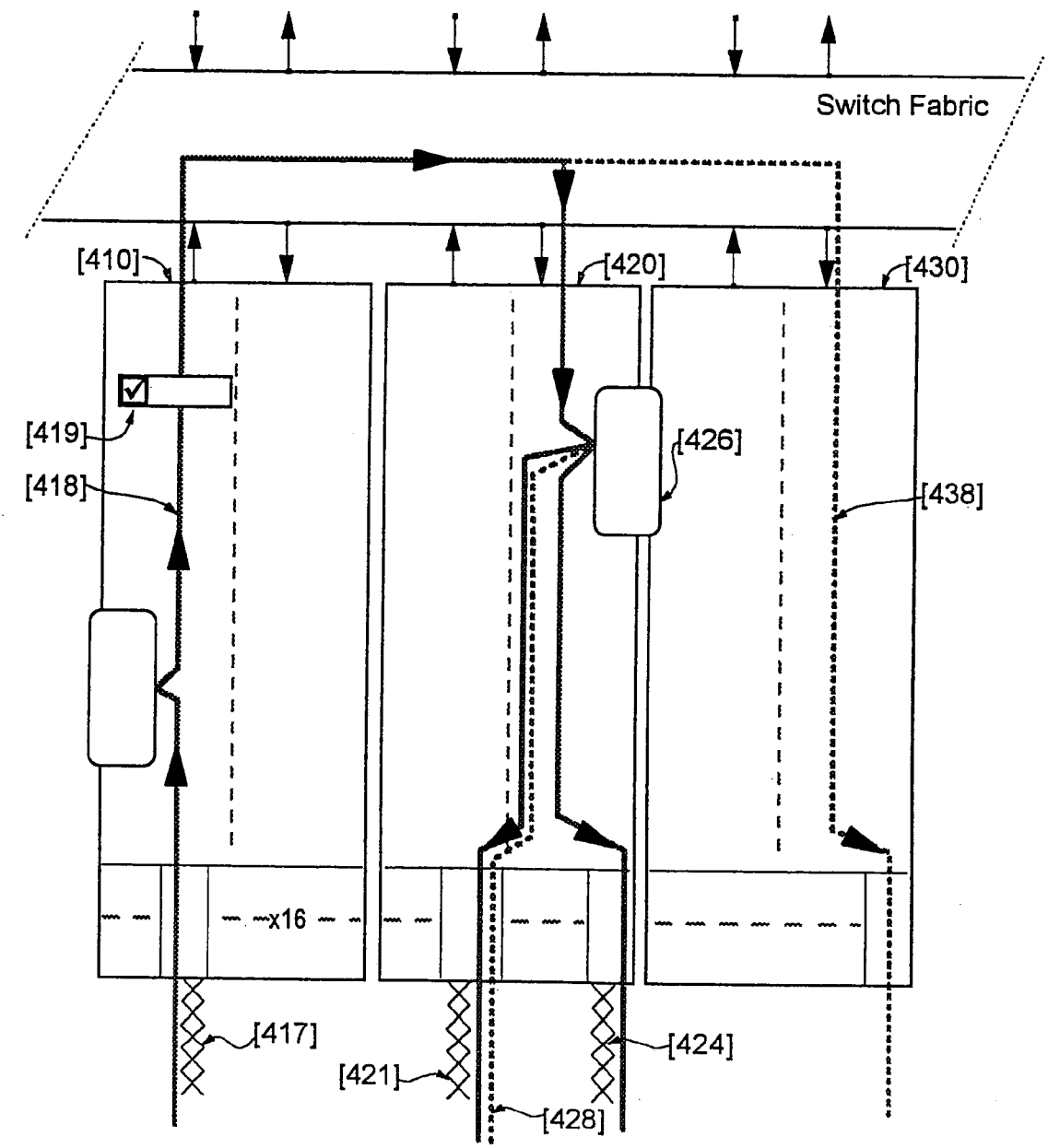
FIG. 3 is a block diagram illustrating cells replication within either the switch fabric or in blades in accordance with a preferred embodiment of the present invention.

FIG. 3 starts describing a preferred embodiment of the invention which is broadly referred to as port snooping in the remaining description. Snooping a node port (i.e., of all the incoming traffic arriving through a line such as 417), so that the traffic can be remotely observed, first consists in real-time marking of all the cells entering the blade from the port. Then a copy of them is transported up to an observation point, possibly through many intermediate other nodes. Upon entering snooping mode, a snoop source point of interest is chosen from which a path must be setup up to the observation point. As with all regular ATM connections the path is set up in advance and must have a reserved bandwidth compatible with the actual throughput of the snooped port so that its traffic can be safely transported and observed from a remote location.

This path setup and bandwidth reservation was previously illustrated in FIG. 2 where path 215 traverses five switching nodes before reaching the, thus enabling observation point 260 to receive a copy of all incoming traffic passing through port 231 and that originating from Token Ring LAN 230. Set up of this path is done under the control of the network manager through the control point of each ATM switch with standard methods and techniques known from the art.

What is different from the prior art is that the control point of the switching node is instructed, by the overall network manager or whatever combination of tools and people are responsible for keeping the network up and running, to mark all cells arriving to port that must be snooped. Techniques for marking the cells are further discussed in the following. Whatever method is used, all cells (irrespective of the channel identifier they are carrying) of an incoming flow 418 from line 417, that is chosen to be snooped, are, upon receipt, marked 419 in blade 410. Cells of flow 418 may subsequently have to be duplicated in the switch fabric itself (using the same overall mechanism as used for multicasting) so that they are sent to the observation point through another blade 430. An extra flow of cells 438 is thus created which is the image of the snooped flow 418, and which follows the path reserved in the network for it up to the last blade where measuring and observation equipment is connected.

This duplication of the snooped flow may also have to be performed on the transmit side of a blade whenever the snooped flow and regular connections use the same blade for exiting a particular switching node. This case is illustrated in FIG. 3 with blade 420. Because of the multicast function that must be supported at switching nodes (discussed hereinabove), cells belonging to some connections listed in table 426 may also have to be replicated locally multiple times (e.g., on lines 421 and 424). Therefore, snooped flow 428 must be further replicated in addition to the replication required by the multicasting of cells belonging to regular connections, if any is required. Consequently, it is possible to send replicated marked cells over the same line as the line borrowed by a regular connection. This is illustrated FIG. 4 where snooped flow goes through line 421.

The above described generation and handling of the marked cells needs to be carried out only in the source node where a port is snooped. All the other nodes, on the path to the observation point, will automatically recognize and handle the marked cells to their final destination.

Figure 4:
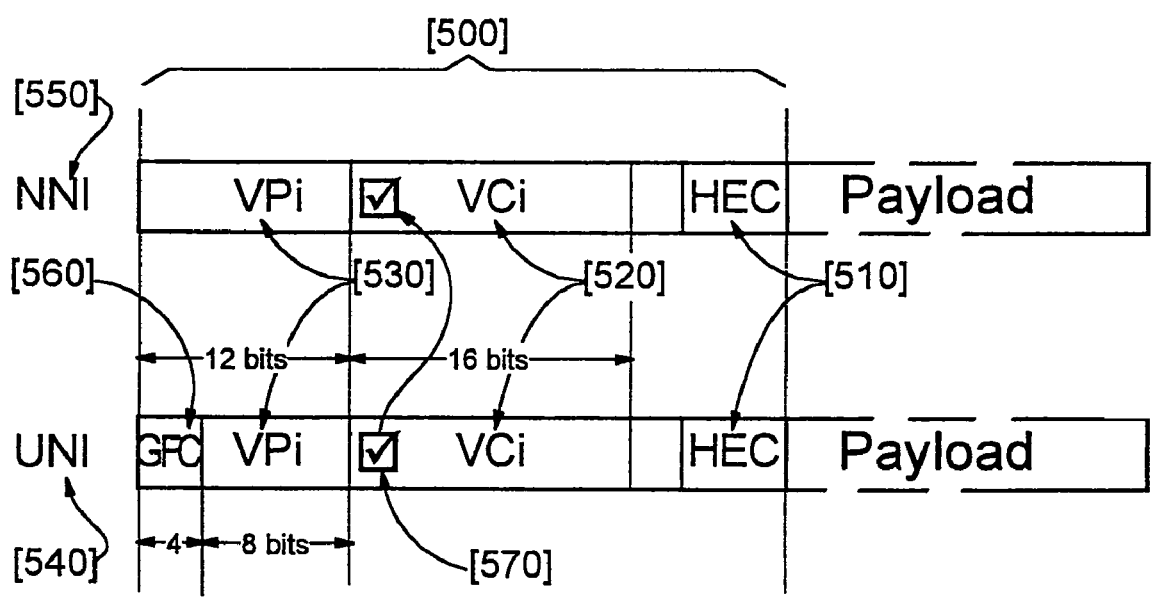
FIG. 4 depicts an ATM cell structure assembled in accordance with a preferred embodiment of the present invention.

FIG. 4 depicts the manner in which cells can be marked so that they are recognized as snooped traffic and are automatically routed, unaltered, to their final destination according to a preferred embodiment of the present invention. ATM cell header 500 is 5-bytes long including a one-byte CRC (called HEC) 510 for transmission protection. The remaining portion of header 500 carries four bytes of information including a 16-bit VCi (Virtual Channel identifier) 520 and a 8-bit or 12-bit VPi (Virtual Path identifier) 530, depending upon the interface and is said to be UNI (User to Network Interface) 540 or NNI (Network to Network Interface) 550. Therefore, at least 24 remaining bits are available within the header to identify a connection.

Because, unlike other protocols, this is not a universal address or identifier, it has only a local significance between two switches and can freely be assigned by the network manager. There is no danger of a shortage of identifiers to differentiate the virtual connections even on the highest speed lines. The only constraint is that identifiers must be unique on the same physical communications line. The simplest method for marking the cells is to borrow one bit of the VPi or VCi fields which, when turned on, signifies that the cell belongs to the snooped traffic and must be processed accordingly. Alternatively, on the UNI interface, which includes a 4-bit GFC (Generic Flow Control) field 560, one of the bits could be devoted to marking the cells. Thus, in a preferred embodiment of the invention, the MSB (Most Significant Bit i.e., bit 15) of the VCi field 570 is chosen to mark the snooped cells. Hence, it becomes network manager responsibility not to use this bit for channel identifiers for the regular connections.

Figure 5:
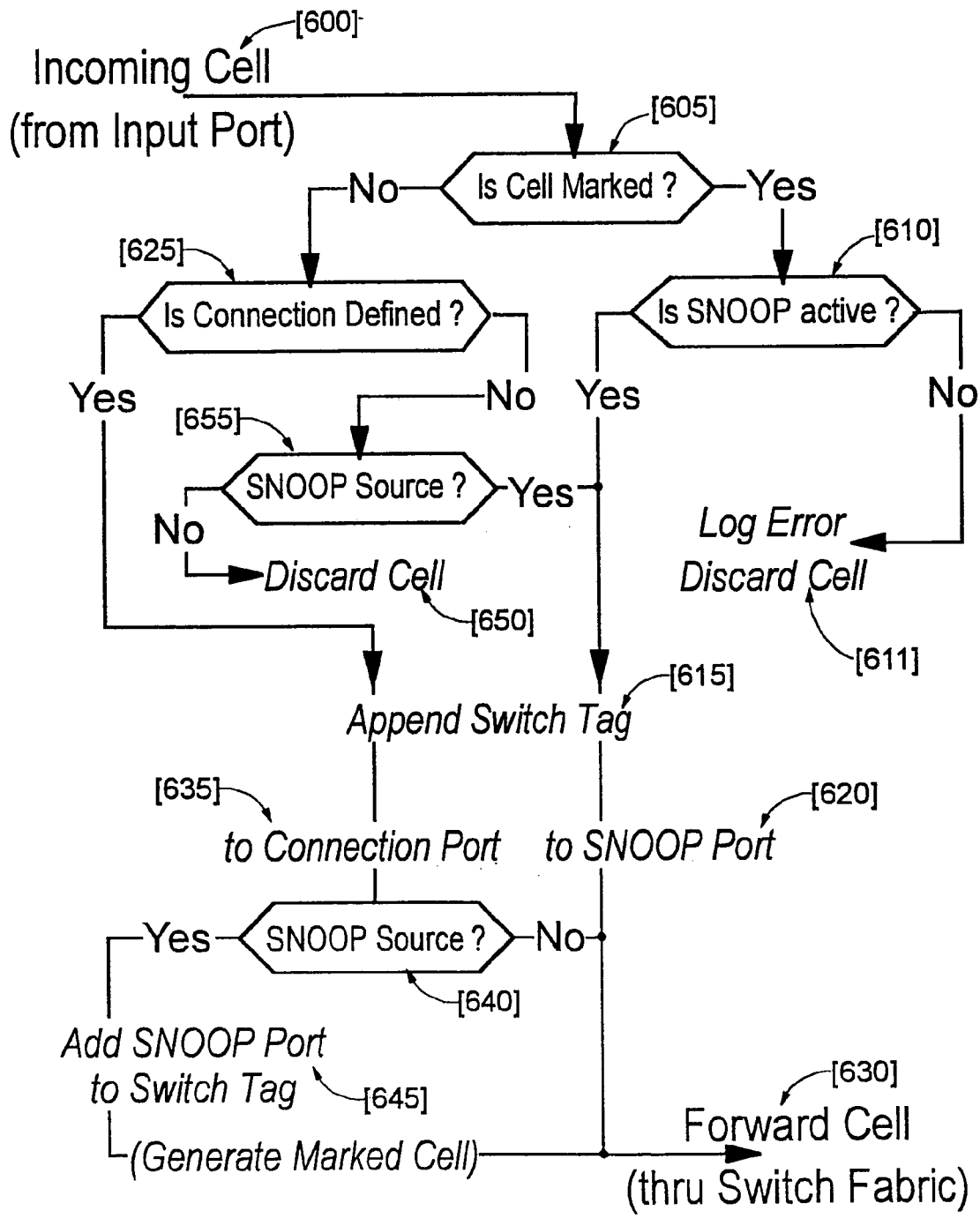
FIG. 5 is a logic flow diagram illustrating the process by which a cell enters a blade in accordance with a preferred embodiment of the present invention.

FIG. 5 illustrates a method for processing cells on the receive side of every blade in accordance with a preferred embodiment of the present invention. For each incoming cell 600, the header is tested 605 to determine if cell has already been marked in a previous node at the origin of the snooped flow. If answer is positive then, next step 610 is to check if the current blade is indeed on the path of the snooped flow as defined by the network manager. If the answer is negative an error situation is encountered and cell must be discarded at step 611.

Normally, if snoop path has been correctly defined the answer to question 610 is positive in which case the marked cell can be forwarded directly to the switch fabric as shown at step 630 after the necessary information has been added to it, so the cell can be steered through the switch fabric and reach the output port from which it will be transported to a next node along the snoop path. What is appended to the cell to cross the switch fabric is highly dependent on the switch fabric design. However, it is generally broadly referred to as a _Switch Tag_ 615. This latter comprises the necessary information to direct the incoming cell to the right port i.e., the outgoing snoop port 620 in this case. Thus, the processing of marked cells, arriving at intermediate nodes, is expedited and those cells are moved along the snoop path unaltered until they reach the observation point.

However, if incoming cell 600 is not marked so that the answer to question 605 is negative, it is a regular cell (non-snoop cell) possibly belonging to one of the virtual connection recognized on the receive side of the current blade. Through the interrogation of a connection table, a determination is made of whether the cell is actually expected because it corresponds to a predefined connection. If the answer to question 625 is positive (the normal case) then, the cell follows the regular process i.e., a switch tag is added 615 which specifies the outgoing connection port 635 so that the cell eventually traverses the switch fabric and reaches the output port following the connection it belongs to.

However, if current blade has been set, by the network manager, as being the source of the snoop flow, snoop traffic must be originated from this blade. Therefore, if answer to the next question 640 is positive the switch tag must be altered so that the switch fabric is instructed to replicate the regular cell to the snoop port 645 also, eventually resulting in the forwarding of a marked cell. If current blade is not a snoop source, the answer to question 640 is negative and the above branch is just bypassed. At this stage it is important to remark that the snoop port and connection port may, for some of the incoming cells, match. In such a case the replication of the regular cell is not handled by the switch fabric itself but rather by the transmit side of the outgoing blade. This is further discussed with reference to FIG. 6.

Finally, if answer to question 625 is negative, the cell is not recognized and should normally be discarded 650. However, if blade has been declared as the source of the snoop flow, so that answer to question 655 is positive, all cells arriving at the snooped port entry must be forwarded to the observation point requiring that a switch tag be added 615 specifying the snoop port 620 like previously described for the incoming marked cells.

Figure 6:
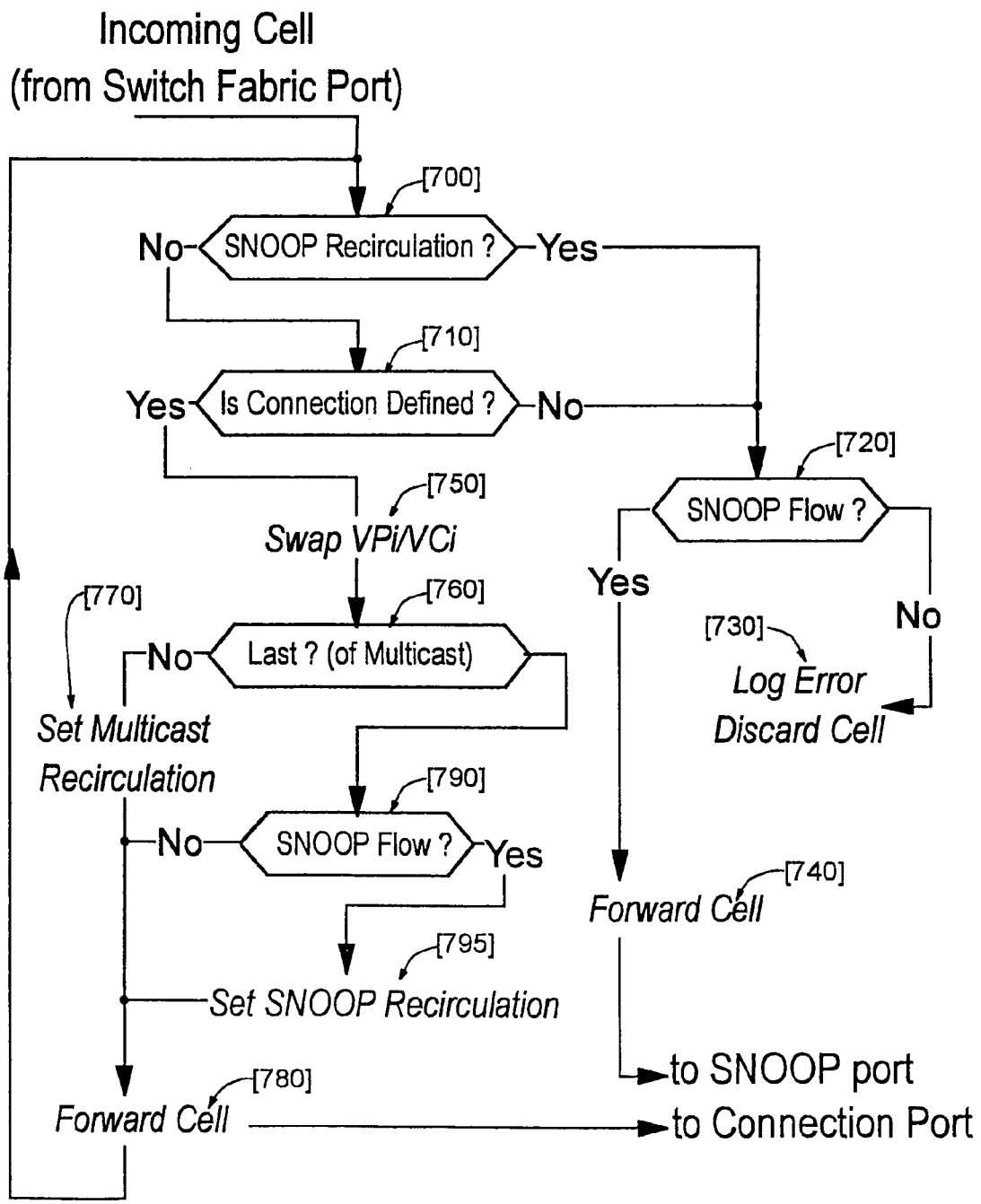
FIG. 6 is a logic flow diagram depicting the process by which a cell exits the switch fabric to a blade in accordance with a preferred embodiment of the present invention.

FIG. 6 is a logic flow diagram depicting the process by which a cell exits the switch fabric to a blade in accordance with a preferred embodiment of the present invention. The method depicted in FIG. 6 focuses on the transmit side of a blade. Each regular cell received from a switch fabric port triggers the interrogation of a local connection table. The objective of this interrogation is many fold. First, a determination is made as to which output a virtual connection cell should be sent. As previously mentioned, this determination may result in several or possible all lines being selected if the cell must be multicast. Therefore, a multicast mechanism allowing replication of cells must be supported in the transmit side of every blade.

A VCi/VPi swap (a standard operation in ATM switches) is also performed as shown at step 750. Since, in ATM networks, channel identifiers have only a local significance, VPi and VCi fields of cell headers are possibly exchanged at each node even though cells are following predetermined virtual paths. Numerous methods of achieving these functions are known the art, each differing according to the actual implementation of switches and blades. Irrespective of such differences of any particular implementation, all methods include the step of adding a correlator to the switch tag wherein the switch tag is appended to the cells received from the lines in the receive side of each blade. This correlator functions as an index that is used to address the local connection table found in each blade transmit side. In conjunction with the local connection table, the correlator is utilized to obtain information for handling the current incoming cell.

Included within the information obtained by utilizing the correlator with the local connection table is the identity of output port(s) that the current cell should be sent and also what VPi/VCi is to be used for each of them. This determination is generally performed within a linked list of destinations which is traversed each time a new cell is received so that the cell may be replicated accordingly. If no multicast is required (i.e., cell is sent on a single outgoing port) then the list becomes a one-item list. Snooping in accordance with the principles set for herein, advantageously utilizes features of multicasting which is merged into the process whenever necessary as explained hereafter.

The algorithm for processing a cell that is received from a switch fabric port on the transmit side of every blade, first includes the step of testing a bit in the switch tag that was appended to the cell to determine whether the cell must be _recirculated_ (i.e., must be replicated), such that the cell participates in the generation of the snoop flow.

It should be noted that not all switch fabric are, per se, "ATM switches" but rather are cell-switches. If the switched cells are truly ATM cells, sufficient information will be appended to guide the cell within the switch fabric itself and the blades. Such appended information is broadly referred to herein as a switch tag as previously discussed. A switch tag includes information imparted by the receive side for the purpose of multicasting of a cell on more than one switch fabric port. The switch tag also includes the above-mentioned correlator that is used as an entry point into the local connection table.

Thus, among the overhead bits added to the ATM cell which is to be switched, one bit is reserved for permitting a snoop recirculation of cells by the transmit side of the blades when necessary. The first step is then to test if this bit is set or not as shown at step 700. When a cell is received from the switch fabric this bit cannot be active since this bit is not set by either the receive side or the switch fabric. In response to a negative response at inquiry step 700, the method proceeds to the interrogation of the local connection table (step 710) to determine whether the cell is expected as being a part of a predetermined flow. If answer is negative, the next step 720 is to determine whether the cell is marked as belonging to the snoop flow. If answer is negative, an error case is detected and logged, and the cell is discarded as shown at step 730.

However, if answer is positive, a snoop cell (marked in current node or a previous node) is recognized and forwarded to the snoop port. This branch of the algorithm corresponds to what was depicted in FIG. 3 and flow 438. If answer to question 710 was however, positive in which case a cell belonging to a registered connection is to be processed the next step 750 is the VPi/VCi swap, a standard operation in ATM network, previously discussed. As shown at next question 760, a determination is made whether the current cell must be replicated. One way of achieving this, as already previously suggested, is to organize in the local connection table linked list of connections on which cells have to be replicated. Hence, unicast and multicast are handled alike i.e., when the end of the linked list is reached (which may comprise only one item) replication is stopped.

If one assumes first that answer to step 760 is negative, a multicast recirculation bit is set 770 in the overhead bits of the cell (i.e., the switch tag) after which cell is forwarded 780 through the selected output port. Obviously, when cell is eventually sent over a telecommunications line, to which output port is tied, so as it is transported to another node, all the overhead (the switch tag) that was appended to the ATM cell for allowing internal processing, is removed. At this stage algorithm resumes in 700. When, at first loop or during a subsequent loop (if cell is multicast), the end of the linked list is eventually reached and the answer to question 760 is positive then, the next step 790 is to wonder if a snoop cell must be generated too. If this is indeed the case the snoop recirculation bit is set 795. Hence, when algorithm resume in 700 answer is finally positive so as branch ending in step 740 is gone through resulting in the forwarding of a snoop cell.

While the invention has been particularly shown and described with reference to a preferred embodiment, it will be understood by those skilled in the art that various changes in form and detail may be made therein without departing from the spirit and scope of the invention.

The invention claimed is:

1. A method of enabling remote surveillance of any entry port to any switching node of an ATM cell-relay network, said ATM cell-relay network comprising one or more of said switching nodes that each include a plurality of ports, said method comprising the steps of:
   setting up a path, through said ATM network, between said entry port and a remote observation point;
   duplicating all cells of incoming traffic entering through said entry port;
   marking all of said duplicated cells, wherein said marking is connection independent; and
   transporting, along said path, said marked and duplicated cells up to said observation point.

2. The method of claim 1, wherein said step of marking all duplicated cells further includes the steps of:
   reserving one bit within a cells channel identifier field to unambiguously distinguish said duplicated cells; and
   asserting said reserved bit of every of said duplicated cells.

3. The method of claim 2, wherein said step of reserving one bit further comprises the step of alternatively utilizing one bit of a cells Generic Flow Control field.

4. The method of claim 2, wherein said step of reserving one bit further comprises the step of reserving a most significant bit of a Virtual Channel identifier field part of said cells channel identifier field.

5. The method of claim 1, wherein said marking step further comprises the step of marking said duplicated cells with any unique combination of bits within a header of said duplicated cells.

6. The method of claim 1, wherein said step of duplicating cells is performed within said switching node of said entry port.

7. The method of claim 1, wherein said step of duplicating cells further comprises the step of duplicating unexpected cells, errored cells, and nonconforming cells.

8. The method of claim 1, wherein within all intermediate said switching nodes along said path up to said observation point, said step of transporting said marked and duplicated cells further comprises the steps of:
   recognizing said marked and duplicated cells upon entry of each of said marked and duplicated cells into a port of each intermediate switching node;
   testing to determine whether said port of each intermediate switching node is included within said path to said remote observation point;
   in response to determining that said port is included within said path to said remote observation point:
     maintaining said marked and duplicated cells unaltered; and
     moving said marked and duplicated cell forward;
   in response to determining that said port is not included within said path to said remote observation point:
   discarding said marked and duplicated cells; and
   recording an error.

9. A system for enabling remote surveillance of any entry port to any switching node of an ATM cell-relay network, said ATM cell-relay network comprising one or more of said switching nodes that each include a plurality of ports, said system comprising:
   means for setting up a path, through said ATM network, between said entry port and a remote observation point;
   means for duplicating all cells of incoming traffic entering through said entry port;
   means for marking all of said duplicated cells, wherein said marking is connection independent; and
means for transporting, along said path, said marked and duplicated cells up to said observation point.

10. The system of claim 9, further comprising:
in each of said switching node:
- a cell switch fabric; and
- adaptive blades between said ports and said cell switch fabric.

11. The system of claim 10, further comprising means within said cell switch fabric or within said adaptive blades for replicating cells.

* * * * *